(12) United States Patent
Shelef (10) Patent No.: US 6,729,589 B2
(45) Date of Patent: May 4, 2004

(54) KINEMATIC MOUNT

(75) Inventor: Gad Shelef, Palo Alto, CA (US)

(73) Assignee: Gizmonics, Inc., Mountain View, CA (US)

( * ) Notice: Subject to any disclaimer, the term of this patent is extended or adjusted under 35 U.S.C. 154(b) by 0 days.

(21) Appl. No.: 10/266,126

(22) Filed: Oct. 7, 2002

(65) Prior Publication Data

US 2004/0065793 A1 Apr. 8, 2004

(51) Int. Cl.[7] .............................................. F16M 11/02
(52) U.S. Cl. ...................... 248/181.1; 33/281; 403/121; 359/399
(58) Field of Search .......................... 33/281, 200, 299; 248/181.1, 181.2, 178.1, 179.1, 180.1; 403/121, 122; 359/399; 356/124

(56) References Cited

U.S. PATENT DOCUMENTS

| | | | |
|---|---|---|---|
| 4,290,574 A | 9/1981 | Archibald | |
| 4,409,738 A | 10/1983 | Renander et al. | |
| 4,842,397 A | 6/1989 | Eisler | |
| 4,929,073 A | 5/1990 | La Plante et al. | |
| 5,157,251 A | 10/1992 | Albrecht et al. | |
| 5,323,540 A | * 6/1994 | McMurtry et al. | 33/559 |
| 5,345,590 A | * 9/1994 | Ault et al. | 33/561 |
| 5,406,405 A | 4/1995 | Sullivan | |
| 5,748,827 A | 5/1998 | Holl et al. | |
| 6,065,898 A | 5/2000 | Hale | |
| 6,072,569 A | 6/2000 | Bowen | |
| 6,325,351 B1 | 12/2001 | Hale et al. | |

OTHER PUBLICATIONS

Martin L. Culpepper, "Design of Quasi–Kinematic Couplings", Precision Engineering, May 2002.
Emil W. Deeg, "New Algorithms for Calculating Hertzian Stresses, Deformations, and Contact Zone Parameters", *AMP J. of Technology,* 2:14–24 (1992).
Piet van Dijk, "Contact Spots", Proc. 20th Conf. on Electrical Contacs, ICEC, 2000.
Layton C. Hale, "Friction–Based Design of Kinematic Couplings", *American Society for Precision Engineering 13th Annual Meeting,* Jul. 30, 1998.

* cited by examiner

*Primary Examiner*—Ramon O. Ramirez
(74) *Attorney, Agent, or Firm*—Morgan, Lewis & Bockius LLP (57) ABSTRACT

The kinematic mount preferably includes a first plate, a second plate, and a three connectors. The first plate has three indentations therein, where the indentations are each located at respective apexes of an equilateral triangle. The second plate has three grooves therein, where the grooves are spaced 120 degrees apart from one another. Each connector comprises a first surface and a second surface. The first surface forms an annular contact line between the first surface and one of the indentations. The second surface is coupled to the first surface and defines two substantially parallel contact lines between the second surface and one of the grooves. In a preferred embodiment, the first surface defines a spherical surface and the second surface defines a cylindrical surface.

30 Claims, 14 Drawing Sheets

FIG. 5C

KINEMATIC MOUNT

BACKGROUND OF THE INVENTION

1. Field of the Invention

The present invention relates generally to kinematic mounts and particularly to an apparatus for removably coupling two plates to one another, such that despite repeated disassembly and reassembly the plates remain in identical positions when reassembled.

2. Description of Related Art

Kinematic mounts, otherwise known as kinematic couplings or restraints, are commonly used to couple measuring equipment or instruments (instrument/s) to a base or substructure, where despite repeated disassembly and reassembly the plates remain in the same relative position to one another as when previously assembled.

Examples of such instruments include: precision instruments, such as optical elements, including lenses mirrors, prisms, telescopes, cameras, lasers, sensors, or the like; sensitive measuring equipment; strain sensitive devices; lithography equipment, such as projection optics; and instruments that are disassembled and moved frequently so that a permanent support is not suitable.

Indeed, very small changes in the position of such instruments can make a substantial difference in the accuracy of results obtained from the instrument. Therefore, kinematic mounts were developed to address such precise repeated assembly.

According to well-known principles, for a rigid body to be completely fixed in space, despite repeated disassembly and reassembly, all six degrees of freedom need to be constrained. In other words, three translations and three rotations must be constrained with respect to some arbitrary fixed coordinate system. A mount is said to be kinematic when all six degrees of freedom are constrained without any additional constraints, i.e., any additional constraints would be redundant. A kinematic mount therefore has six independent constraints.

One well-known kinematic mount includes a fixed base plate which has three V-shaped grooves formed therein. Each groove forms an angle of approximately 120 degrees with each other groove, and the walls of each groove form angles of approximately 45 degrees with the surface of the base plate. On a second plate, three convex spherical members are secured roughly in an equilateral triangular array. When the second plate is rested upon the first plate, each of the three convex spherical members rests within one of the three grooves, contacting the two side walls of each respective groove at two point contacts. Any instrument secured to the second plate, which may be lifted from the base plate and, when replaced, will occupy the identical position relative to the base, which normally remains fixed.

However, the above described point contacts between each spherical member and groove leads to concentrated forces at these contact points. These concentrated forces lead to high stresses, known as Hertzian stresses, both at the spherical member and at the groove.

The above described mount, while being sufficient for light loads, such as laboratory applications or light-duty field applications, fails in heavy-duty applications, such as when used in space launch vehicles, where high intensity vibrations and shocks cause failure at the point contacts.

In light of the above it is highly desirable to provide a kinematic mount that addresses the high stresses generated by point contacts, while still providing a kinematic mount, as described above.

SUMMARY OF THE INVENTION

According to the invention there is provided a kinematic mount for repeatedly coupling two components together. The kinematic mount preferably includes a first plate, a second plate, and three connectors. The first plate has three indentations therein, where the indentations are each located at respective apexes of an equilateral triangle and are preferably conical indentations. The second plate has three grooves therein, where the grooves are spaced about 120 degrees apart from one another. Each connector comprises a first surface and a second surface. The first surface forms an annular contact line between the first surface and one of the indentations. The second surface is coupled to the first surface and defines two substantially parallel contact lines between the second surface and one of the grooves. In a preferred embodiment, the first surface defines a spherical surface and the second surface defines a cylindrical surface. A center of a sphere that defines said spherical surface substantially coincides with a centerline of a cylinder that defines said cylindrical surface.

This kinematic mount provides increased stiffness and repeatability under high loads.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings. For ease of reference, the first number of any reference numeral generally indicates the Figure number in which the reference numeral can be found.

DETAILED DESCRIPTION OF PREFERRED EMBODIMENTS

The kinematic mount is used to removably couple two components, such as plates, together in an identical relative position as when previously coupled. The kinematic mount applies exactly six constraints against the three translational and three rotational degrees of freedom and thus reduces stress between the connector and the second plate. This increases the load capacity and the mechanical stiffness of the kinematic mount, while reducing wear and failure.

Figure 1A:
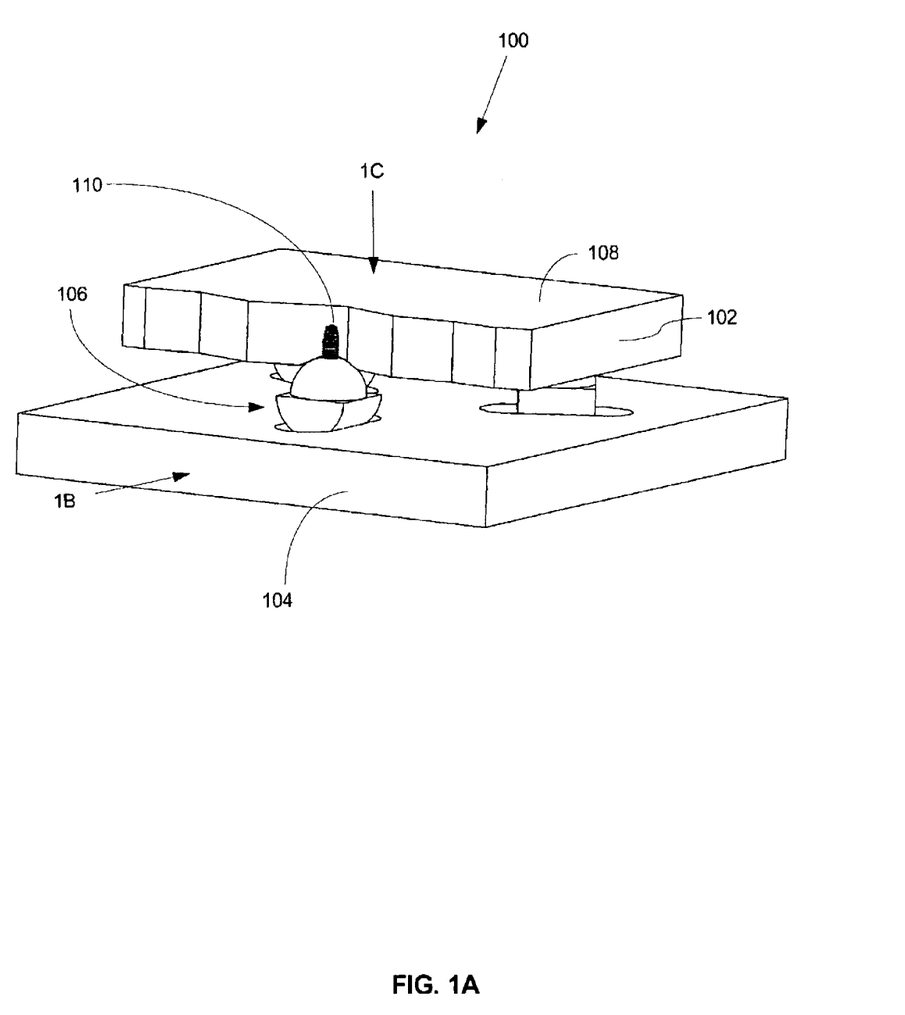
FIG. 1A is a partial section isometric view of a kinematic mount, according to an embodiment of the invention.
Figure 1B:
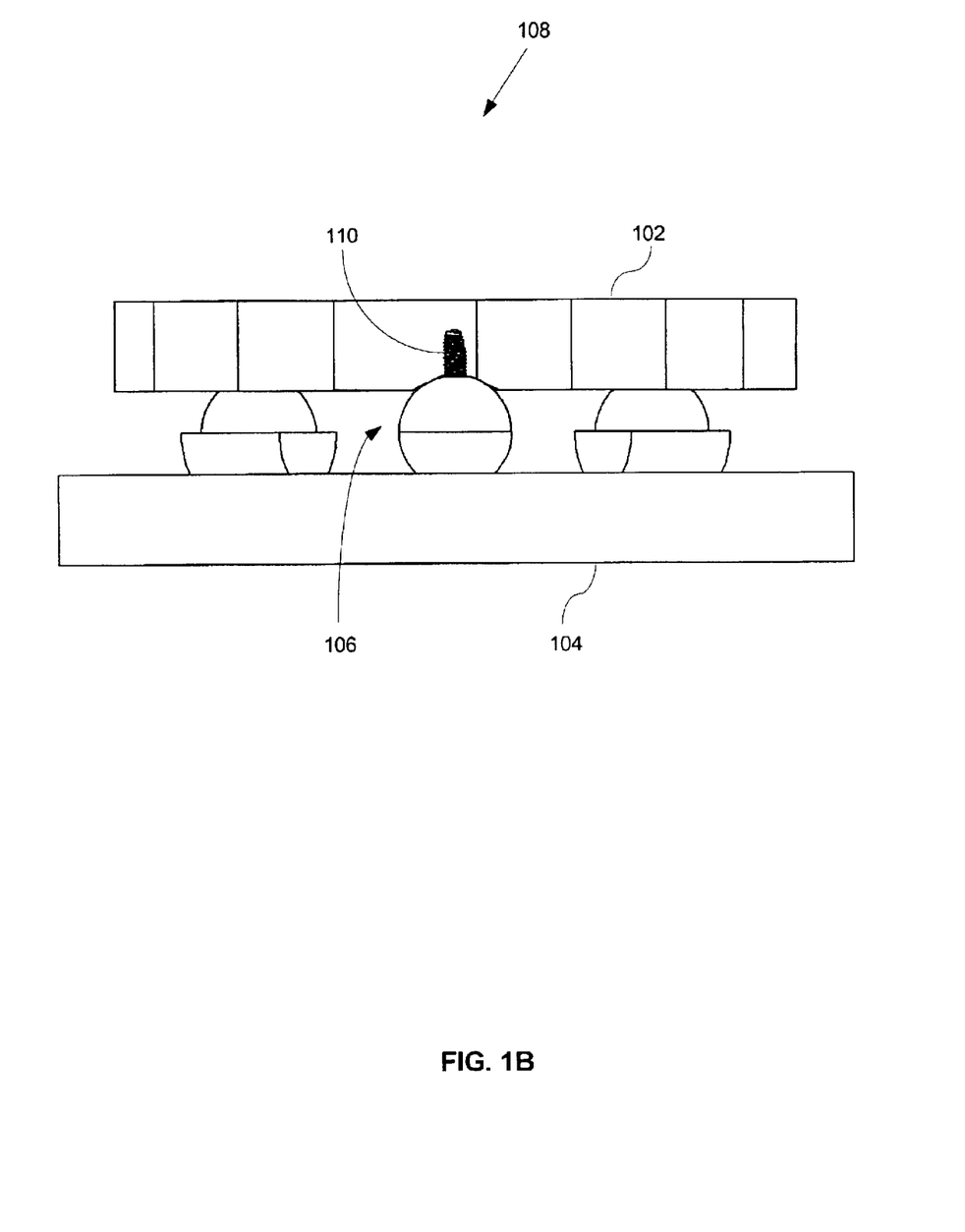
FIG. 1B is a side view of the kinematic mount shown in FIG. 1, as viewed along line 1B of FIG. 1A.
Figure 1C:
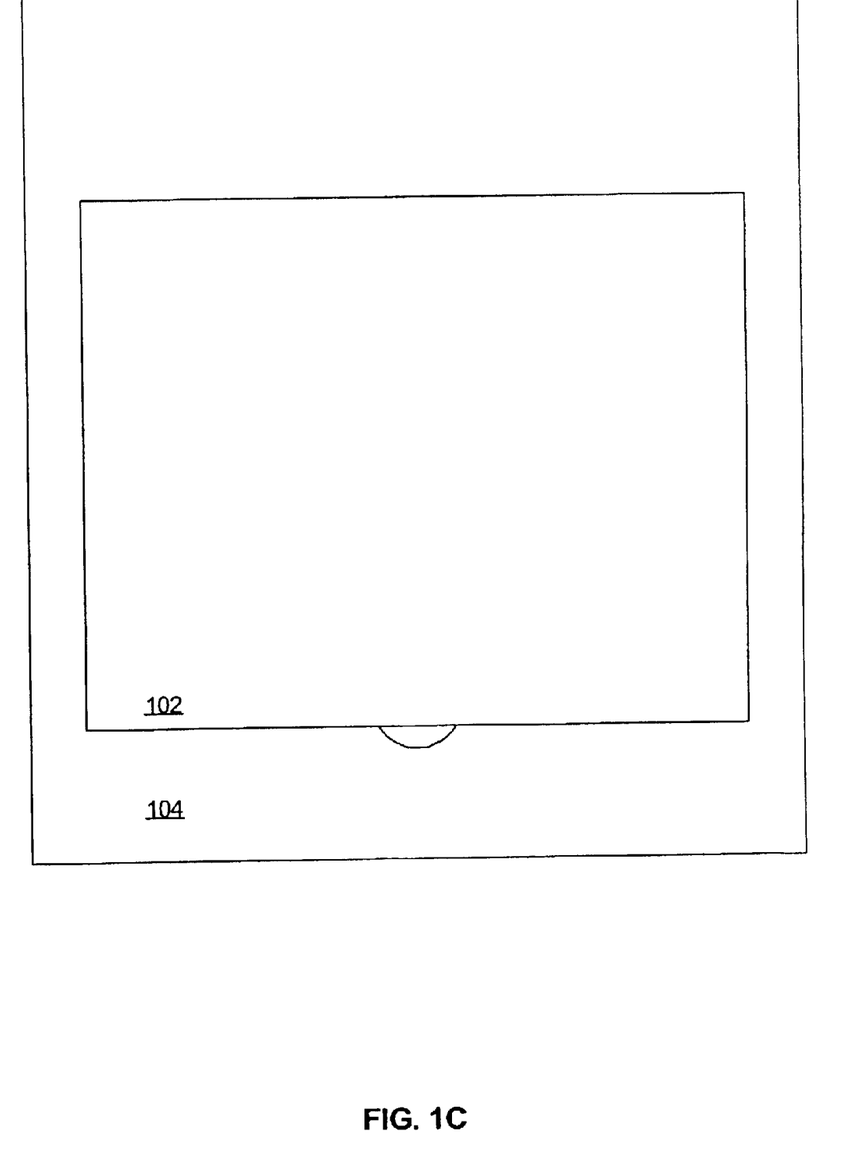
FIG. 1C is a top view of the kinematic mount shown in FIG. 1, as viewed along line 1C of FIG. 1A.

FIG. 1A is a partial isometric view of a kinematic mount 100; FIG. 1B is a side view of the kinematic mount 100, as viewed along line 1B in FIG. 1A; and FIG. 1C is a top view of the kinematic mount shown in FIG. 1A, as viewed along line 1C of FIG. 1A. When assembled, the kinematic mount includes the following components: a first plate 102, a second plate 104, and three connectors 106 used to couple the first plate, connector, and second plate to one another. For ease of explanation, the first plate 102 is partially cut-away to expose the connector 106. In a preferred embodiment the plates 102 and 104 are substantially flat, however, it should be appreciated that the plates may take on any suitable form.

In a preferred embodiment, an instrument is attached to a first side 108 of the first plate 102 remote from the connector 106. Similarly, in a preferred embodiment, the second plate 104 is attached to a rigid support, such as a tripod. Alternatively, the instrument may be attached to the second plate, and the first plate attached to a rigid support. One or more screws 110 are used to clamp the first plate 102, connector 106, and second plate 104 together, as explained in further detail below.

Figure 2A:
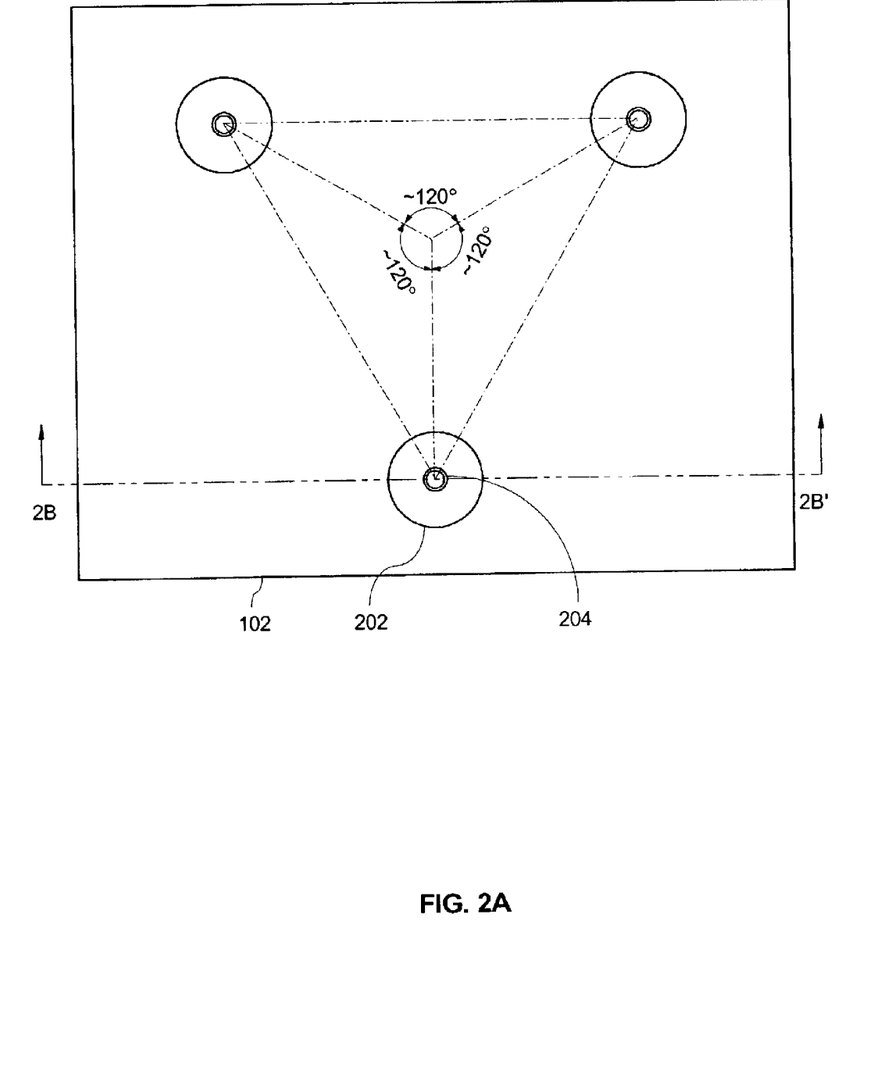
FIG. 2A is a bottom view of a first plate shown in FIG. IA.
Figure 2B:
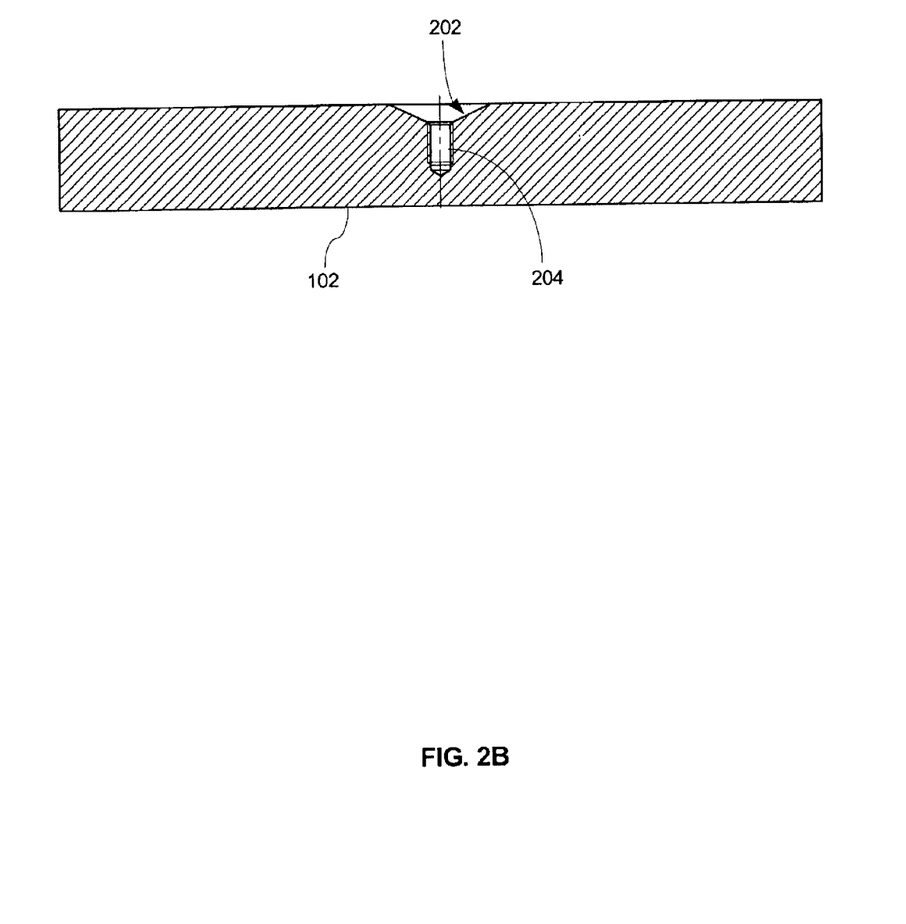
FIG. 2B is a cross-sectional view of the first plate shown in FIG. 1A, as viewed along line 2B–2B' of FIG. 2A.

FIG. 2A is a bottom view of a first plate shown in FIG. 1A, while FIG. 2B is a cross-sectional view of the first plate shown in FIG. 1A, as viewed along line 2B–2B' of FIG. 2A. The top plate 102 includes three indentations 202 disposed at the apexes of an equilateral triangle, i.e., disposed approximately 120 degrees apart from one another. The indentations 202 are preferably frustro-conical (conical frustum) indentations. However, in an alternative embodiment, the indentations may be any suitable shape, such as: hemispherical, frusto-hemispherical, frusto-pyramidal, pyramidal, conical, arcuate, or the like.

In a preferred embodiment, the indentation 202 includes a threaded screw-hole 204 at the center of the indentation 202 extending into the first plate away from the side of the first plate that has the indentation. The thread of the screw-hole is sized to receive the screw 110 of FIGS. 1A and 1B.

Figure 3A:
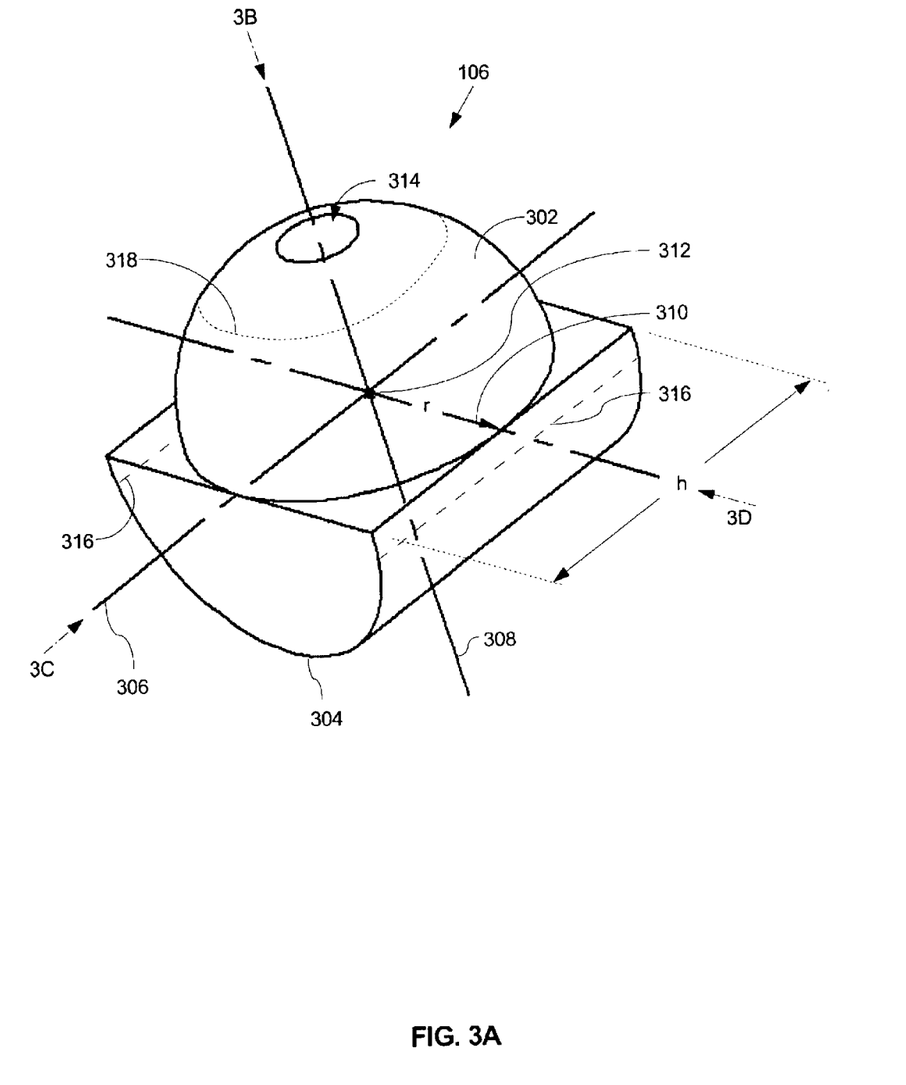
FIG. 3A is a partial isometric view of a connector shown in FIG. 1A.
Figure 3B:
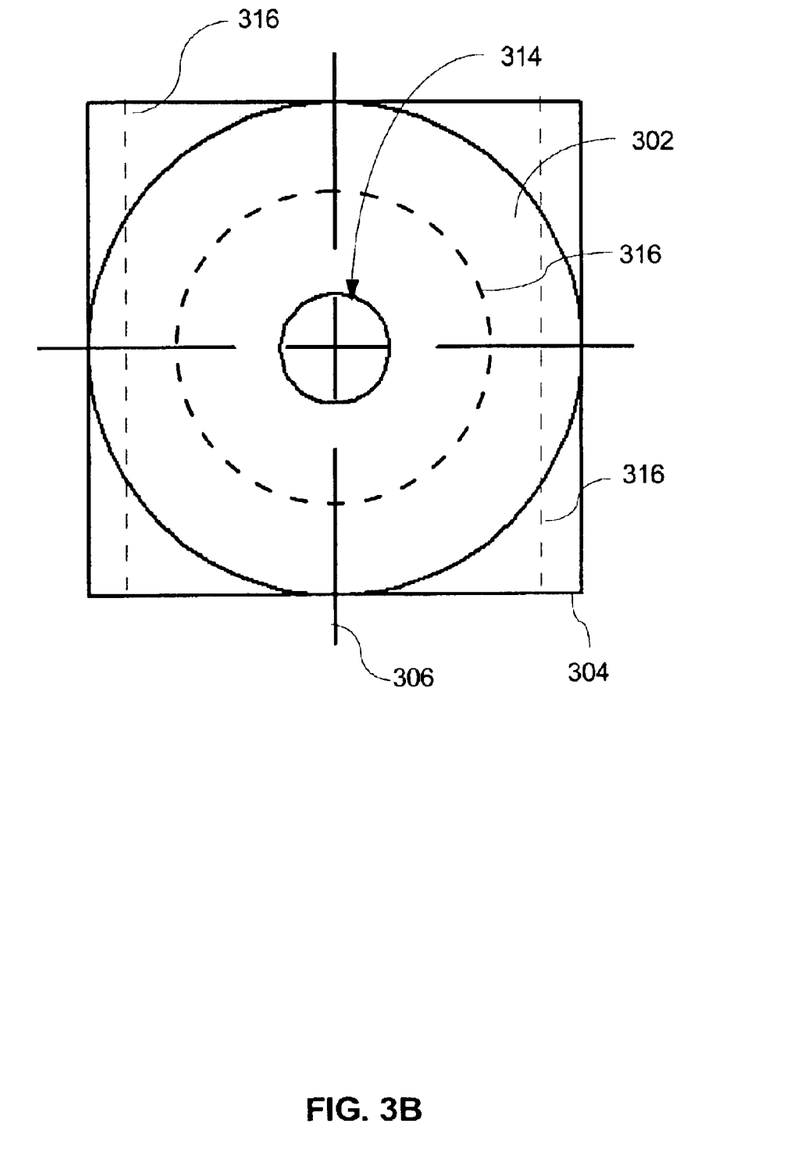
FIG. 3B is a top view of a connector shown in FIG. 3A, as taken along line 3B of FIG. 3A.
Figure 3C:
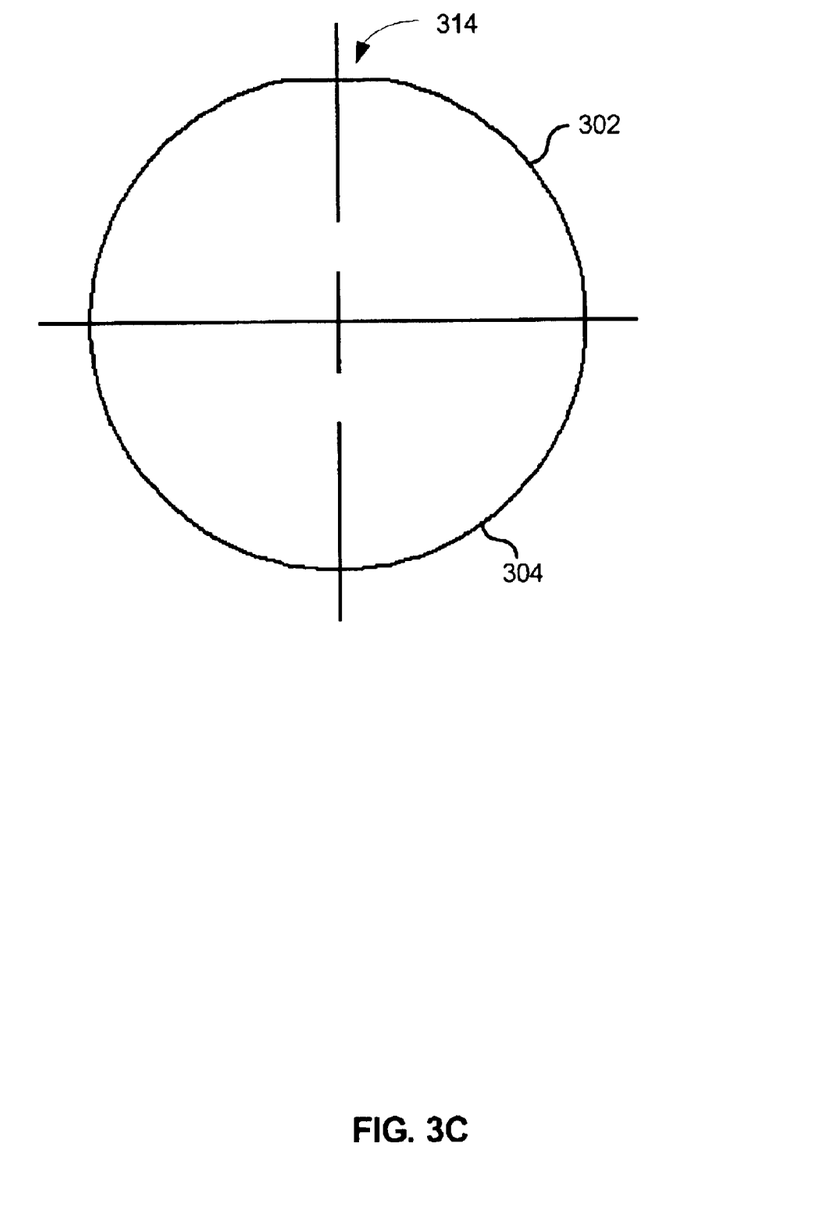
FIG. 3C is a first side view of a connector shown in FIG. 3A, as taken along line 3C of FIG. 3A.
Figure 3D:
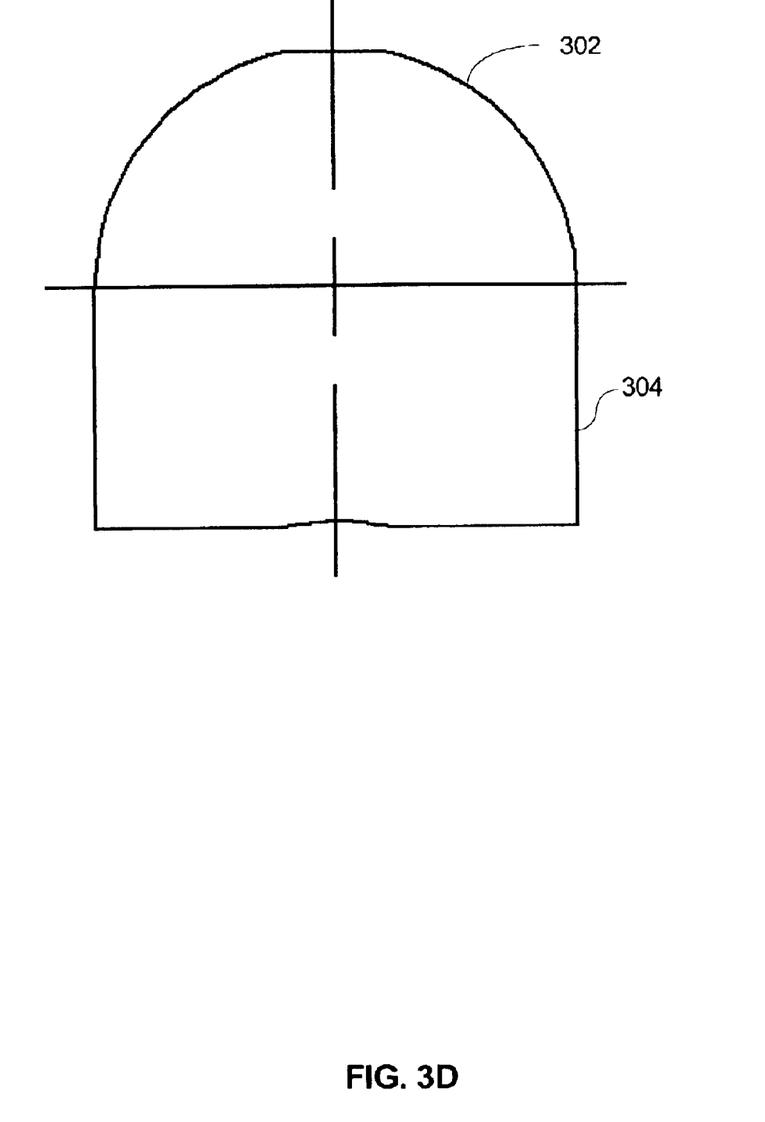
FIG. 3D is a second side view of a connector shown in FIG. 3A, as taken along line 3D of FIG. 3A.
Figure 4A:
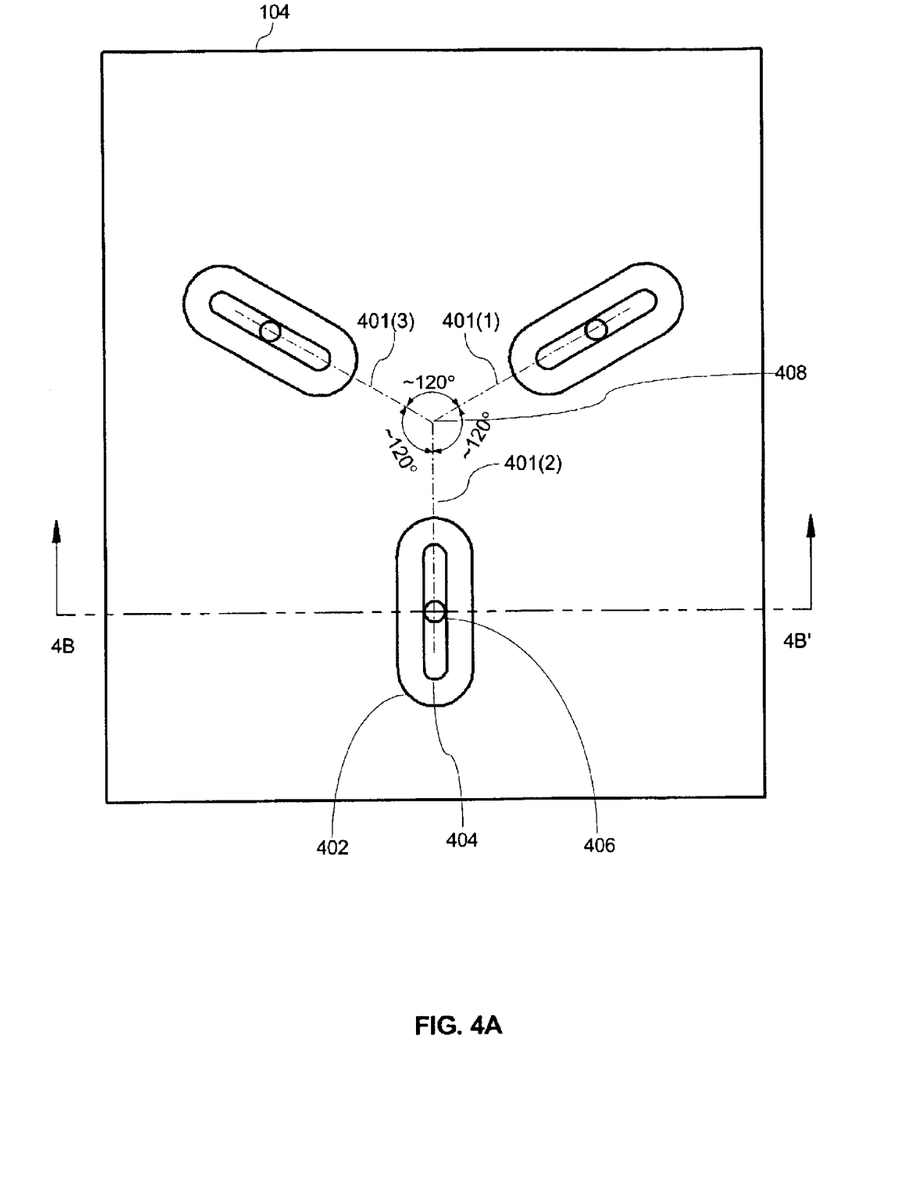
FIG. 4A is a top view of a second plate shown in FIG. 1A.

FIG. 3A is a partial isometric view of a connector 106 shown in FIG. 1A; FIG. 3B is a top view of the connector 106 shown in FIG. 3A, as taken along line 3B of FIG. 3A; FIG. 3C is a first side view of a connector shown in FIG. 3A, as taken along line 3C of FIG. 3A; and FIG. 3D is a second side view of a connector shown in FIG. 3A, as taken along line 3D of FIG. 3A. Connector 106 comprises a first surface 302 and a second surface 304. The first surface 302 defines an annular contact line 318 between the connector 106 and first plate 102 (FIG. 1A)—within the indentation 202 (FIGS. 2A and 2B) of the first plate 102. Similarly, the second surface 304 defines two contact lines 316 between the connector 106 and the second plate 104 (FIG. 2A)—within a groove 402 (FIG. 4A). The contact lines 316 are substantially parallel to one another.

In a preferred embodiment, the first surface 302 defines a hemisphere and the second surface 304 defines a half-cylinder or hemicylinder. The hemisphere is half of a sphere cut by a plane passing through the sphere's center 312. Similarly, the half-cylinder is half a cylinder cut by the same plane passing through the cylinders longitudinal axis 306. Therefore, the centers of the hemisphere and cylinder preferably coincide so that the plates will not move relative to each other on consecutive reassemblies.

Also in a preferred embodiment, the radius "r" 310 of the hemisphere about the center 312 is substantially the same as the radius "r" of half-cylinder about the longitudinal axis 306.

Still further, in a preferred embodiment, the connector 106 forms a hole 314 there through that intersects: an apex of the first surface 302, the center 312, and an apex of the second surface 304. The hole has a diameter larger than the diameter of the screw 110 (FIG. 1A) passing through it, letting the connector and second plate adjust themselves without being over constrained by the screw location. This allows any clamping force between the first plate, connector, and second plate to be evenly distributed about the annular contact line 318 and the two substantially parallel contact lines 316.

The location of each plate is tied to the location of the connector through the center of the spherical surface or the centerline of the cylindrical surface. Because the connector is free to rotate a little about the centerline of the cylindrical surface, if the center of the spherical surface and the centerline of the cylindrical surface do not coincide, the plates will move relative to each other on consecutive reassembly. Accordingly, the centers of the spherical surface and the centerline of the cylindrical surface preferably coincide.

Figure 4B:
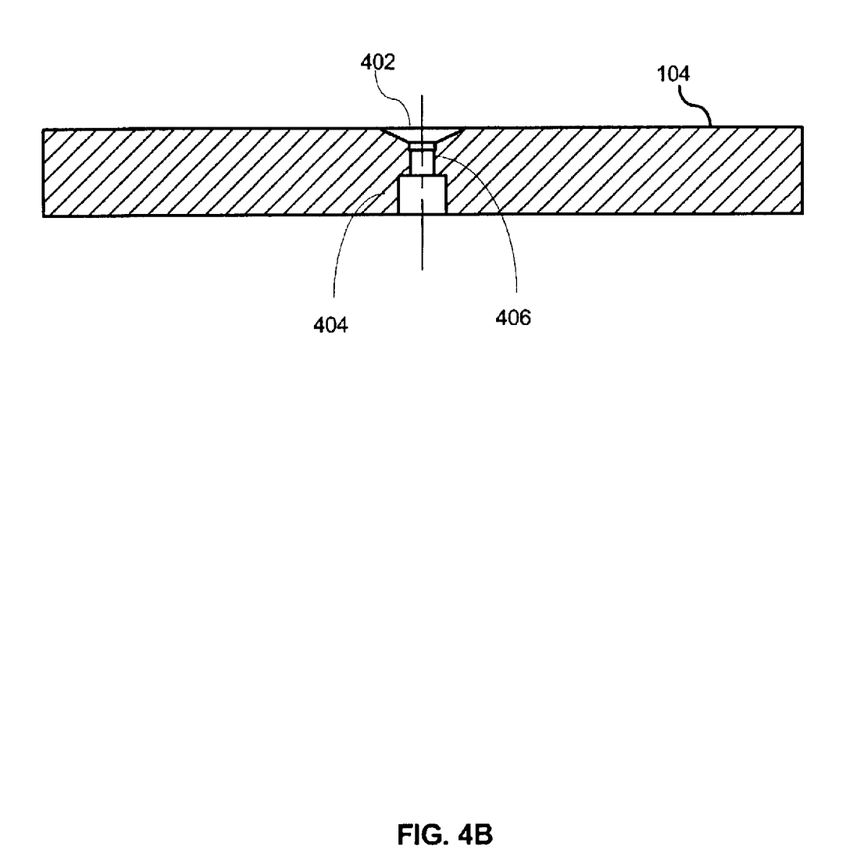
FIG. 4B is a cross-sectional view of the second plate shown in FIG. 4A, as viewed along line 4B–4B' of FIG. 4A.

FIG. 4A is a top view of a second plate 104 shown in FIG. 1A, while FIG. 4B is a cross-sectional view of the second plate 104 shown in FIG. 4A, as viewed along line 4B–4B' of FIG. 4A. The second plate 104 includes three grooves 402 extending along longitudinal axes 401(1)–(3) toward a central point 408. The longitudinal axes of the grooves are disposed 120 degrees apart from one another. Each groove 402 preferably forms a frusto-triangular prism indentation in the second plate, i.e., an indentation having a frusto-triangular cross-section. However, in an alternative embodiment, the grooves may have any suitable shape or cross section, such as: a triangular cross-section; a V-shaped cross-section; a half-cylinder indentation; an arcuate cross-section; or the like.

In a preferred embodiment, the second plate 104 defines a slot 404 at the apex (or low-point depending on orientation) of the groove 402. The slot 404 includes a hole 406 at its center extending through the second plate. The hole preferably has a diameter slightly larger than the screw 110 (FIG. 1A).

Therefore, to assemble the kinematic mount, a connector 106 (FIG. 1A) is placed in each groove 402 (FIG. 4A) of the second plate 104 (FIG. 1A) so that the second surface 304 (FIG. 3A) of each connector forms two substantially parallel contact lines 316 (FIG. 3A) with each corresponding groove. The indentations 202 (FIG. 2A) formed in the first plate 102 (FIG. 1A) are then positioned over the corresponding first surface 302 of each connector 106 (FIG. 1A) so that the first surface 302 (FIG. 3A) of each connector forms an annular contact line 318 (FIG. 3A) with each corresponding indentation. The two plates are now aligned.

In a preferred embodiment, a screw 110 (FIG. 1A) is passed through the hole 406 (FIG. 4A) in the second plate 104 (FIG. 1A), through the hole 314 (FIG. 3B) in the connector 106 (figure 1A), and into the threaded hole 204 (FIG. 2B) in the first plate 102 (FIG. 1A). The screw is then tightened to clamp the first and second plates together.

To further reduce over constraining the mount, a spherical or conical washer may be placed under the head of the screw. This spherical or conical washer allows tilting of the screw within the holes in the second plate and connector, thereby compensating for machining tolerances, or the like.

Figure 5A:
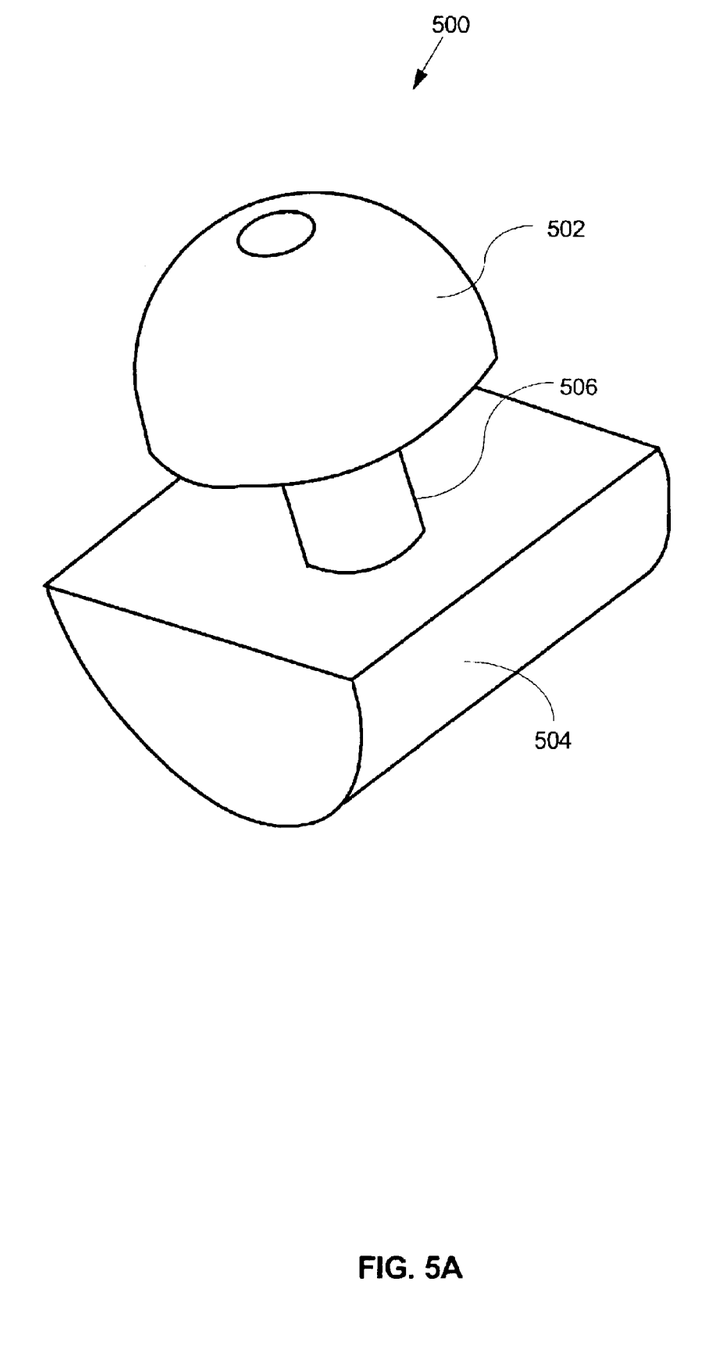
FIG. 5A is another connector, according to another embodiment of the invention.

FIG. 5A is another connector 500, according to another embodiment of the invention. This connector 500 has a partial spherical first surface 502 coupled to a half-cylinder second surface 504 by means of a post. The first surface 502 still defines an annular contact line and the second surface 504 still defines two contact lines, as described above.

Figure 5B:
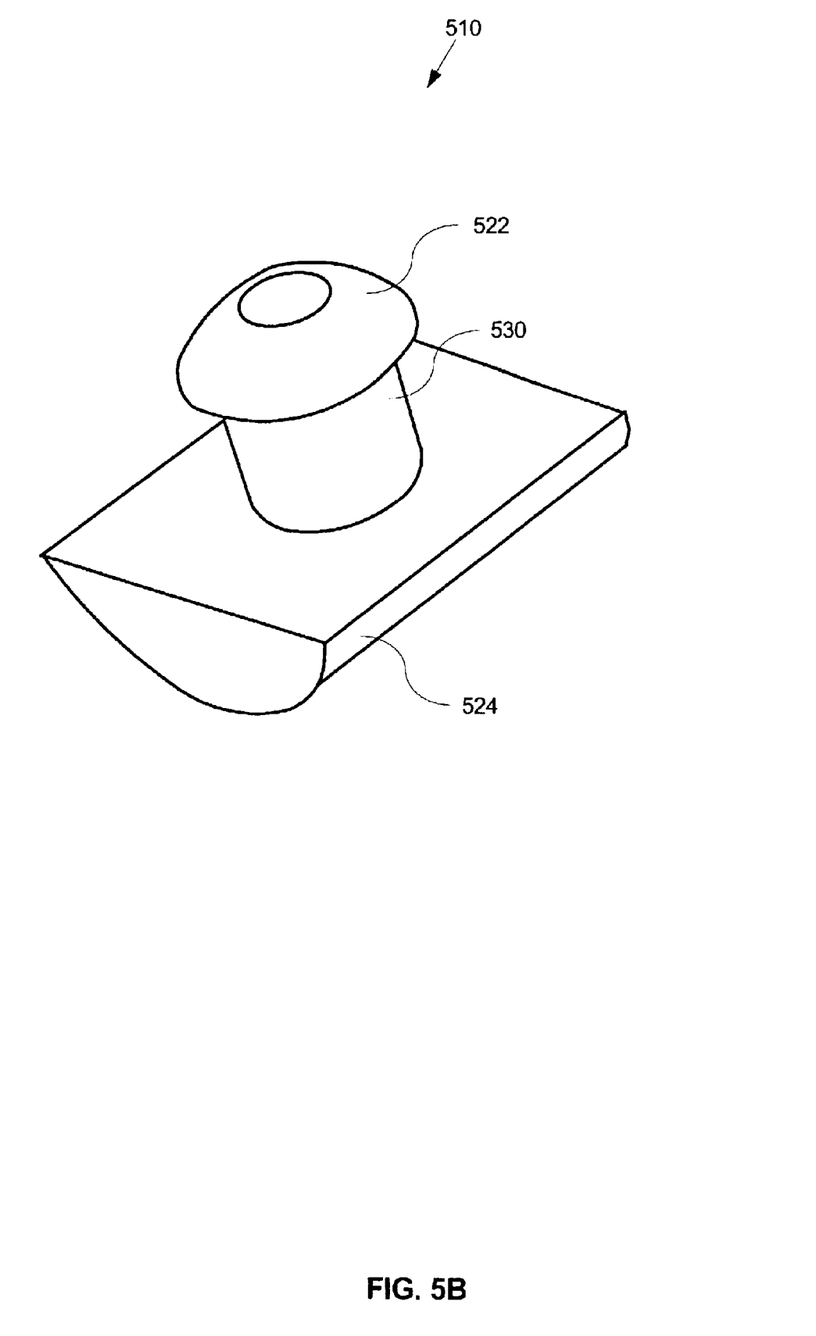
FIG. 5B is still another connector, according to still another embodiment of the invention.

FIG. 5B is still another connector 510, according to still another embodiment of the invention. Here, a partial spherical first surface 522 is coupled to a partial cylindrical second surface 524 via a post 530.

Figure 5C:
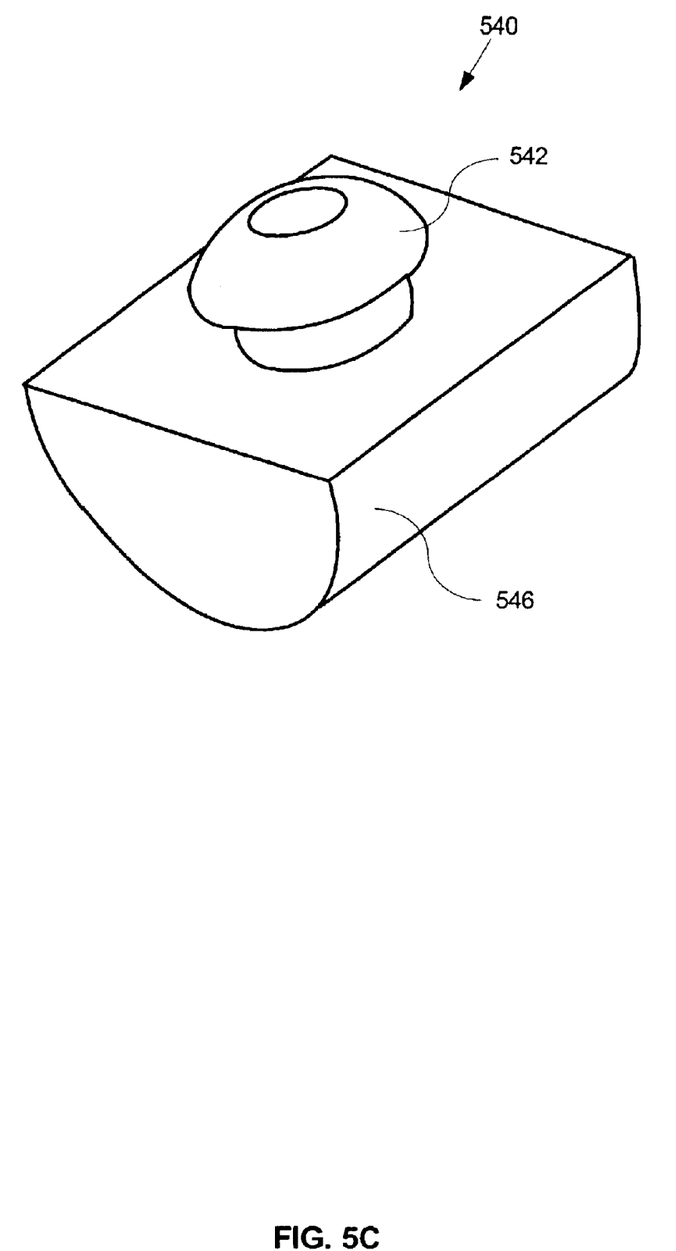
FIG. 5C is even another connector, according to even another embodiment of the invention.

FIG. 5C is even another connector 540, according to even another embodiment of the invention. Here a partial spherical first surface 542 is coupled to a cylindrical second surface 546, also via a post.

The above described substantially parallel contact lines form line contacts with the sides of the grooves 402 (FIG. 4A). This is quite unlike the prior art, which forms a point contact at the grooves. It is this line contact that distributes the applied load, and reduces the build-up of point stresses that form at point contacts. Therefore, the above described invention increases stability, stiffness and, therefore, repeatability under higher loads of the kinematic mount, while reducing stress and wear.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, the first surface and second surface may take on any suitable shape, as long as each surface defines the contact lines, as described above. Also, the various components described above are preferably made of a hard material, such as stainless steel. Alternatively, any suitable material may be used. The embodiments were chosen and described above in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents. In addition, any references cited above are incorporated herein by reference.

What is claimed is:

1. A kinematic mount for repeatedly coupling two components together, said kinematic mount comprising a connector having:
    a first surface defining an annular contact line, wherein said first surface is configured to contact a first plate only along said annular contact line; and
    a second surface coupled to said first surface, wherein said second surface defines two substantially parallel contact lines, wherein said second surface is configured to contact a second plate only alone said substantially two parallel lines.

2. The kinematic mount of claim 1, wherein said first surface defines a spherical surface.

3. The kinematic mount of claim 1, wherein said first surface defines a partial spherical surface.

4. The kinematic mount of claim 1, wherein said first surface defines a hemisphere.

5. The kinematic mount of claim 1, wherein said second surface defines a cylindrical surface.

6. The kinematic mount of claim 1, wherein said second surface defines a partial cylindrical surface.

7. The kinematic mount of claim 1, wherein said second surface defines a half-cylinder.

8. The kinematic mount of claim 1, wherein said first surface defines a spherical surface and said second surface defines a cylindrical surface, wherein a center of a sphere that defines said spherical surface substantially coincides with a centerline of a cylinder that defines said cylindrical surface.

9. The kinematic mount of claim 1, wherein said first surface defines a hemisphere and said second surface defines a half-cylinder, and wherein a diameter of said hemisphere is substantially the same as the diameter of said cylinder.

10. The kinematic mount of claim 1, including three connectors.

11. The kinematic mount of claim 10, wherein said first plate has three indentations therein, where each indentation is sized to engage with said annular contact line of a respective first surface of one of said three connectors.

12. The kinematic mount of claim 11, wherein said indentations are frusto-conical or frusto-hemispherical.

13. The kinematic mount of claim 11, wherein said first plate further defines a screw-hole in each indentation.

14. The kinematic mount of claim 13, wherein said screw-hole is threaded for engagement with a screw.

15. The kinematic mount of claim 11, wherein three indentations are each located at a respective apex of an equilateral triangle.

16. The kinematic mount of claim 10, wherein said second plate has three grooves therein, where each groove is sized to form said two substantially parallel contact lines with a respective second surface of one of said three connectors.

17. The kinematic mount of claim 16, wherein said groove is a frusto-triangular prism indentation.

18. The kinematic mount of claim 16, wherein second plate further defines a screw-hole in each groove.

19. The kinematic mount of claim 16, wherein said three grooves each have a longitudinal axis disposed 120 degrees from each other.

20. A kinematic mount comprising:
    a first plate having three indentations therein, where said indentations are each located at respective apexes of an equilateral triangle;
    a second plate having three grooves therein, where said grooves are spaced 120 degrees apart from one another; and
    three connectors, where each connector comprises:
        a first surface that forms an annular contact line between said first surface and one of said indentations; and
        a second surface coupled to said first surface, wherein said second surface defines two substantially parallel contact lines between said second surface and one of said grooves.

21. The kinematic mount of claim 20, wherein said first surface defines a spherical surface.

22. The kinematic mount of claim 20, wherein said first surface defines a partial spherical surface.

23. The kinematic mount of claim 20, wherein said first surface defines a hemisphere.

24. The kinematic mount of claim 20, wherein said second surface defines a cylindrical surface.

25. The kinematic mount of claim 20, wherein said second surface defines a partial cylindrical surface.

26. The kinematic mount of claim 20, wherein said second surface defines a half-cylinder.

27. The kinematic mount of claim 20, wherein said first surface defines a spherical surface and said second surface defines a cylindrical surface, wherein a center of sphere that defines said spherical surface substantially coincides with a centerline of a cylinder that defines said cylindrical surface.

28. The kinematic mount of claim 20, wherein each indentation is sized to form said annular contact line with a respective first surface of one of said three connectors.

29. The kinematic mount of claim 20, wherein each groove is sized to form said two substantially parallel contact lines with a respective second surface of one of said three connectors.

30. The kinematic mount of claim 20, wherein said first surface defines a spherical surface and said second surface defines a cylindrical surface.

* * * * *

UNITED STATES PATENT AND TRADEMARK OFFICE
CERTIFICATE OF CORRECTION

PATENT NO. : 6,729,589 B2
DATED : May 4, 2003
INVENTOR(S) : Gad Shelef

It is certified that error appears in the above-identified patent and that said Letters Patent is hereby corrected as shown below:

Column 5,
Line 64, replace "alone" with -- along --.

Signed and Sealed this

Nineteenth Day of April, 2005

JON W. DUDAS
*Director of the United States Patent and Trademark Office*